United States Patent [19]
Scheibl

[11] Patent Number: 5,555,356
[45] Date of Patent: Sep. 10, 1996

[54] SYSTEM AND METHOD FOR GENERATING A TRIMMED PARAMETRIC SURFACE FOR DISPLAY ON A GRAPHIC DISPLAY DEVICE

[75] Inventor: Frederick J. Scheibl, Rhinebeck, N.Y.

[73] Assignee: International Business Machines Corporation, Armonk, N.Y.

[21] Appl. No.: 968,628

[22] Filed: Oct. 29, 1992

[51] Int. Cl.$^6$ .................................................. G06T 15/00
[52] U.S. Cl. ........................................ 395/134; 395/123
[58] Field of Search ................................ 395/125–126, 395/129, 141, 118–120, 123, 134

[56] References Cited

U.S. PATENT DOCUMENTS

| | | | |
|---|---|---|---|
| 4,181,954 | 1/1980 | Rosenthal et al. | 364/520 |
| 4,213,252 | 7/1980 | Sullivan et al. | 35/10.24 |
| 4,263,726 | 4/1981 | Bolton | 434/43 |
| 4,888,713 | 12/1989 | Falk | 395/119 |
| 4,912,664 | 3/1990 | Weiss et al. | 395/141 |
| 5,175,806 | 12/1992 | Muskovitz et al. | 395/125 |
| 5,226,115 | 7/1993 | Fiasconaro | 395/141 |
| 5,283,860 | 2/1994 | Einkauf et al. | 395/134 |
| 5,315,537 | 5/1994 | Blacker | 364/570 |
| 5,377,320 | 12/1994 | Abi-Ezzi et al. | 395/163 |

OTHER PUBLICATIONS

Hoppe, et al, "Mesh Optimization", *Siggraph*, vol. 1, No. 6, Aug. 1993, pp. 19–26.
Rockwood, et al, "Real–time Rendering of Trimmed Surfaces", *Siggraph*, vol. 23, No. 3, Jul. 1989, pp. 107–116.
"Approximation of a Parametric Bicubic Surface", B. Dimsdale; IBM Technical Disclosure Bulletin, vol. 15, No. 5, pp. 1651–1654; Oct., 1972.
"Generalized Depth Candidacy Reduction Theorem and Its Application", S. Boinodiris; IBM Technical Disclosure Bulletin, vol. 23, No. 2, pp. 470–473; Jul., 1980.
"Computer Graphics Using Multi–Echelon Processing Structures", S. Boinodiris; IBM Technical Disclosure Bulletin, vol. 23, No. 9, pp. 3996–4005; Feb., 1981.
"Finite Element Mesh Generation of 3D–Surfaces in CAD", G. C. Onwubolu; Computers & Structures, vol. 32, No. 1, pp. 31–36; 1989.
"Visualization of Molecular Structures Under the graPHIGS API V2 Environment at IBM 6090 and RISC System/6000 Workstations", J. V. Dave and W. L. Luken; IBM Technical Disclosure Bulletin, vol. 33, No. 10A, pp. 92–93; Mar. 1991.
"Method for Replacing Vertex Normals Caused by Degenerate Surface Representations in a Computer Graphics System", M. A. Einkauf and J. Wu; IBM Technical Disclosure Bulletin, vol. 33, No. 10B, pp. 365–368; Mar. 1991.

*Primary Examiner*—Mark K. Zimmerman
*Assistant Examiner*—Rudolph Buchel
*Attorney, Agent, or Firm*—Mark S. Walker; William Kinnaman, Jr.

[57] ABSTRACT

A method and system for representing an arbitrary parametric surface having one or more trimming polylines applied thereto. A quadrilateral mesh coextensive with the parametric surface is generated. The quadrilateral mesh has a plurality of edges and vertices coinciding with the line segments and points of the trimming polylines. In order to generate the quadrilateral mesh, a two-dimensional array of U,V values is defined, wherein points in the array are adjusted to include the points of the trimming polylines. After all of the points needing adjustment are adjusted, the points in the array are evaluated, thereby creating geometric coordinate values for each point in the array.

20 Claims, 8 Drawing Sheets

SYSTEM AND METHOD FOR GENERATING A TRIMMED PARAMETRIC SURFACE FOR DISPLAY ON A GRAPHIC DISPLAY DEVICE

TECHNICAL FIELD

This invention relates in general to computer graphics, and more particularly, to a method and system for representing an arbitrary trimmed parametric surface as a quadrilateral mesh.

BACKGROUND ART

The evolution of computer technology has resulted in the creation of a sophisticated technical art devoted to the representation of graphical information generated by computers. This art is referred to as computer graphics. In recent years, the use of three-dimensional computer graphics in scientific and engineering applications has increased, along with the demand for realistic images.

Besides lines, markers and polygons, computer graphics displays today support more general geometric parameters, such as parametric surfaces. An example of parametric surfaces includes non-uniform rational B-spline surfaces which are useful in CAD/CAM applications in representing objects such as automobile fenders and the like. Parametric surfaces can be either untrimmed or trimmed to accommodate irregular edges, holes and intersections with other surfaces.

Parametric surfaces may be represented as a quadrilateral mesh, in which the mesh is a two-dimensional array of points. However, for trimmed surfaces, the quadrilateral mesh representation has previously been problematic since areas along the trimmed surfaces are normally tessellated into discrete polygons with variable detail in the tessellation around the areas of the trimming curve intersection. In other words, certain areas of the trimming curve would be tessellated further such that additional points would be generated which need to be evaluated. This causes a decrease in efficiency and system performance because the advantages of the regular mesh are lost.

Therefore, a need exists for a method and system for representing a trimmed parametric surface as a quadrilateral mesh, such that the mesh in most cases, can maintain the same number of points. A need also exists for a method and system for representing a trimmed parametric surface wherein system performance and efficiency is not degraded. A need further exists for a technique for representing a trimmed parametric surface wherein the points of an array representing the parametric surface coincide with the points of the trimming polylines. Further, a technique for representing a trimmed parametric surface is needed, wherein the rendering hardware is capable of making a distinction between included and excluded areas.

DISCLOSURE OF INVENTION

The shortcomings of the prior art are overcome and additional advantages are provided through the provision of a method for representing a parametric surface as a quadrilateral mesh in a computer graphics system. A plurality of line segments representative of one or more trimming polylines applied to the parametric surface are defined and a quadrilateral mesh coextensive with the parametric surface is generated. The quadrilateral mesh includes a plurality of edges which coincide with the plurality of line segments of the trimming polylines.

In one embodiment, in order to generate the quadrilateral mesh, an array of U,V values is defined. The array represents points of the parametric surface before the trimming polylines are applied. In addition, a plurality of points representative of the trimming polylines are identified, and a determination is made as to whether each of the points is located within the array. The points not located in the array are placed in the array thereby replacing neighboring U,V values located in the array.

In another embodiment, a method for representing a trimmed parametric surface in a computer graphics system is provided. An array of U,V values representing points of a parametric surface are defined and one or more trimming polylines to be applied to the parametric surface are identified. Each of the trimming polylines has a plurality of points, and a determination is made as to whether each of the points is located within the array. Each of the plurality of points determined not to be in the array is placed in the array such that a final array of values is provided. Each of the plurality of points replaces a neighboring U,V value located in the array.

In a further embodiment, a determination is made as to whether the neighboring value can be replaced and if it cannot be replaced, a row or a column is added to the array.

In yet a further embodiment of the invention, a quadrilateral mesh representative of the parametric surface defined by the final array is generated. A predetermined surface defining function is used to determine a plurality of geometric coordinates for each of the U,V values in the final array, and a predetermined normal defining function is used to determine a surface normal for each of the U,V values in the final array.

In addition to the above, in one embodiment, a corresponding adjustment indicator is set for each of the points on the trimming polylines.

In yet a further embodiment, the points of the final array define a number of quadrilaterals, and a determination is made as to whether each of the quadrilaterals is to be rendered. For each of the quadrilaterals to be rendered, a corresponding trimming indicator is set.

In another aspect of the invention, a system for representing a parametric surface as a quadrilateral mesh is provided. A plurality of line segments representative of one or more trimming polylines applied to the parametric surface are defined and a quadrilateral mesh coextensive with the parametric surface is generated. The quadrilateral mesh includes a plurality of edges which coincide with the plurality of line segments of the trimming polylines.

In one embodiment, the system includes means for defining an array of U,V values which represents a parametric surface before the trimming polylines are applied, means for identifying a plurality of points representative of trimming polylines applied to the parametric surface, means for determining whether each of the points is located within the array and means for placing in the array each of the points which are not in the array. The points added to the array replace neighboring U,V values in the array.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

FIG. 3 depicts one example of a flow diagram of the representation technique of the present invention;

BEST MODE FOR CARRYING OUT THE INVENTION

Figure 1:
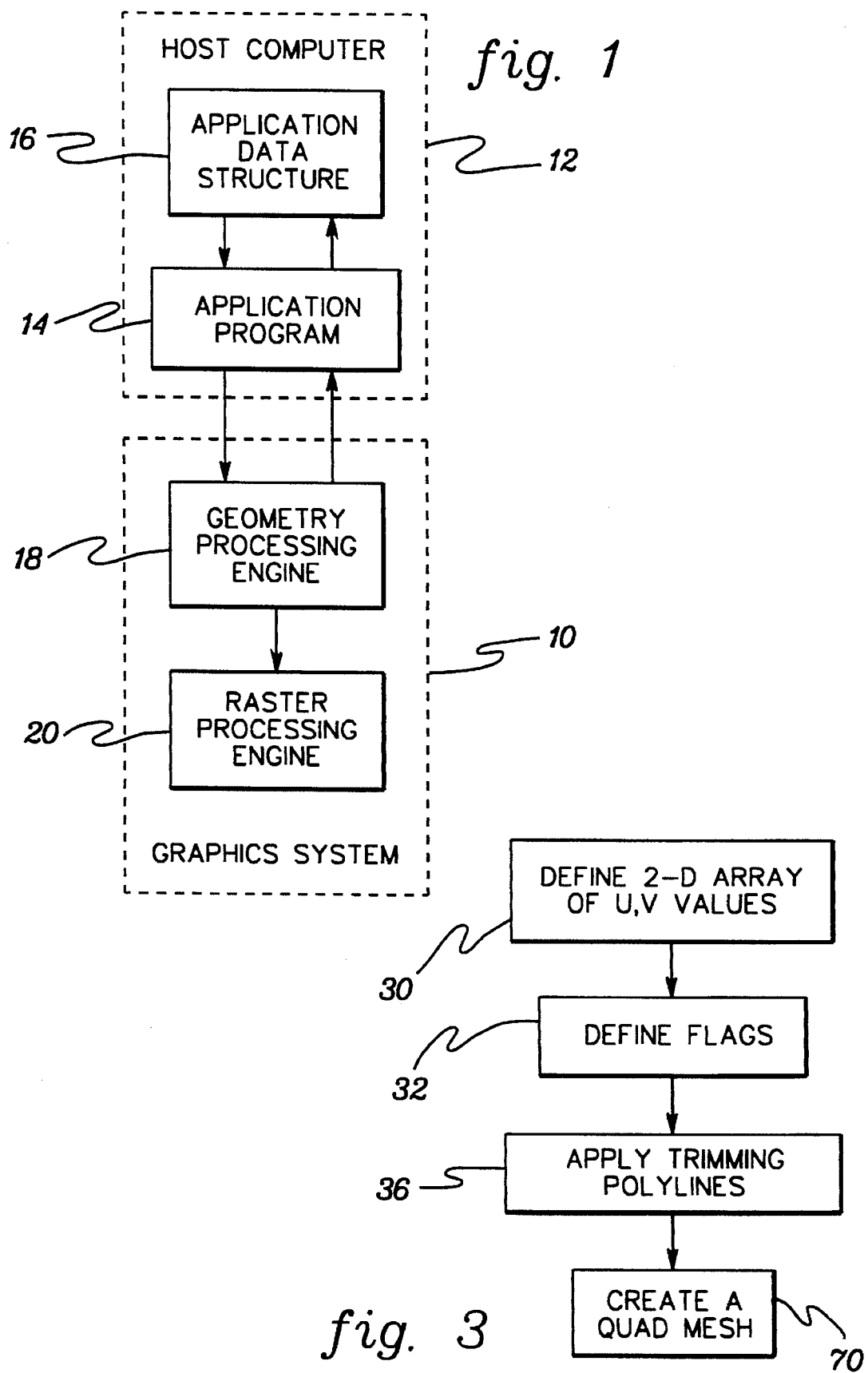
FIG. 1 depicts a general block diagram representation of the interaction between a graphics system and a host computer.

In FIG. 1, a general block diagram representation of the interaction between a graphics system 10 and a host computer 12 is shown. Computer 12 includes an application program 14 and an application data structure 16. Application program 14 stores into and retrieves data from application data structure 16 and sends graphics commands to graphics system 10. Data structure 16 holds descriptions of real or abstract figures or objects which are to appear on a graphics monitor (not shown) associated with system 10. An object description stored within data structure 16 comprises geometric coordinate data which defines the shape of components of the object, object attributes, and connectivity relationships and positioning data that define how the components fit together. For example, objects are commonly defined by geometric primitives or polygons, such as quadrilaterals or triangles.

Graphics system 10 includes a geometry processing engine 18 and a raster processing engine 20 coupled thereto. Engines 18 and 20 comprise separate subsystems, each of which typically includes multiple pipelined or parallel connected processors. In accordance with the principles of the present invention, engine 18 includes, for example, the components used to generate a quadrilateral mesh representative of a trimmed parametric surface. In addition, engine 18 is used to transform, clip and calculate the lighting of each of the vertices of the quadrilateral mesh. Raster processing engine 20 traditionally implements a scan operation wherein individual pixels are integer processed (e.g., through an edge processor and a span processor coupled thereto) for ultimate screen display.

Figure 2:
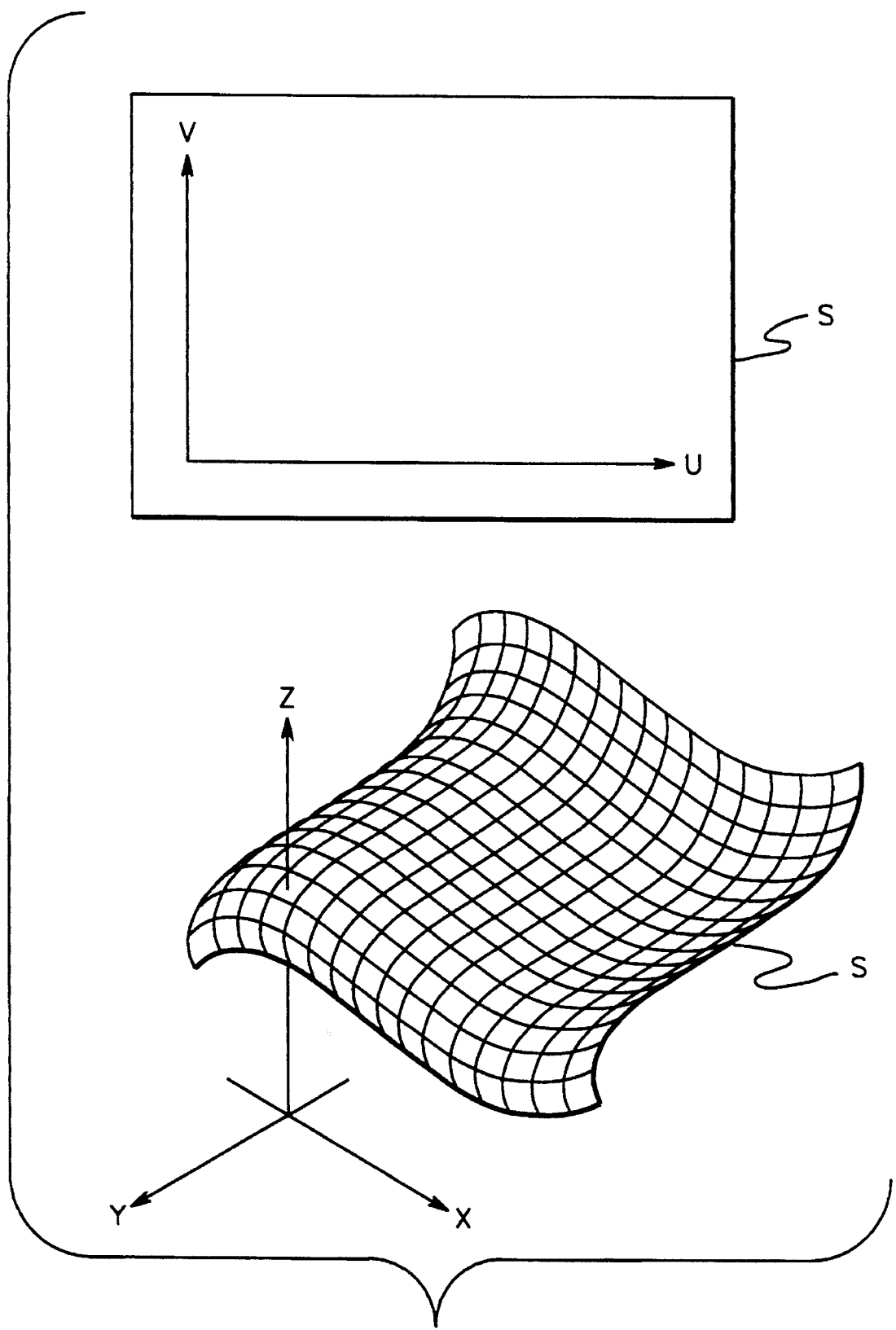
FIG. 2 is an illustration of a parametric surface represented in an X,Y,Z coordinate space and a U,V parameter space.

In accordance with the principles of the present invention, a technique for representing a trimmed parametric surface, is described. A parametric surface, such as, for example, a non-uniform rational B-spline (NURBS) surface, consists of a two-dimensional rectangular surface which may be bent, stretched and twisted to form a three-dimensional shape. One illustration of a parametric surface, S, in geometric (X,Y,Z) coordinate space is depicted in FIG. 2. The insert in FIG. 2 depicts the internal parametric coordinates of the same surface S. Parametric surfaces are useful in CAD/CAM applications in representing objects, such as automobile fenders and the like; however, to adequately depict such objects on, for example, a graphics display, the surfaces should be trimmed to accommodate irregular edges, holes, and intersections with other surfaces. In order to trim parametric surfaces, one or more trimming curves are applied in parametric space (U,V) to the parametric surface. A trimming curve includes a plurality of trimming polylines.

In accordance with the principles of the present invention, the trimmed parametric surface is represented as a quadrilateral mesh. A quadrilateral mesh is defined as a two-dimensional array of vertices in geometric coordinate space. Groups of four adjacent vertices define four sided polygons, which represent the parametric surface. (It is possible that two or more of the vertices of a four-sided polygon may be the same U,V value, and thus when rendered it could appear as a triangle, line or point which also represents the parametric space. Therefore, polygon is used herein to represent four-sided polygons, triangles, lines or points.) A quadrilateral mesh of N rows and M columns contains (N−1)×(M−1) four-sided polygons. Thus, operations, such as evaluating, transforming, clipping, mapping and lighting are performed on N×M vertices.

Figures 4A, 4B:
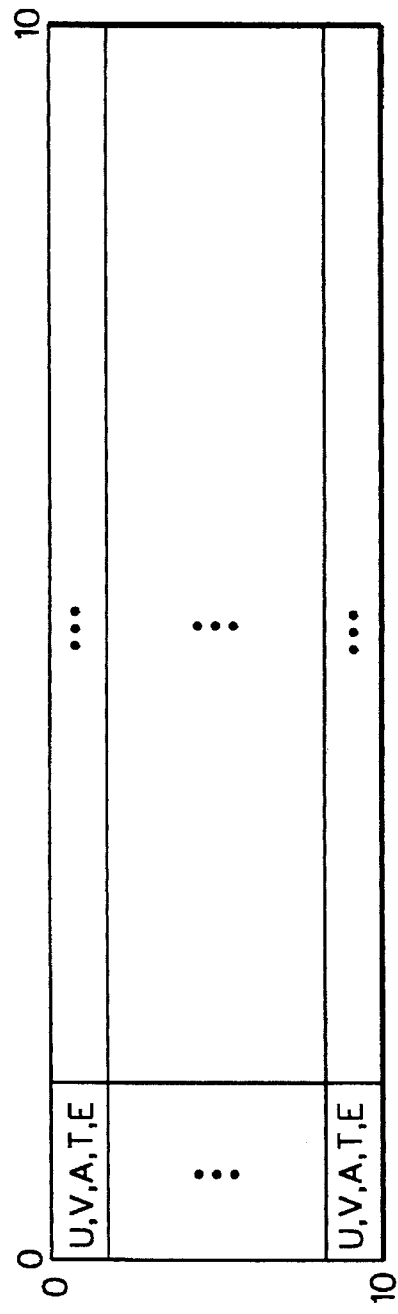
FIG. 4a depicts one example of a two-dimensional array of U,V values representative of a parametric surface, in accordance with the principles of the present invention.
FIG. 4b depicts one example of a two-dimensional array of U,V values and several flags defined in accordance with the principles of the present invention.

With reference to FIG. 3, a technique for generating a quadrilateral mesh representative of a trimmed parametric surface is described in detail. In accordance with the principles of the present invention, initially, a two-dimensional array of U,V values representative of a parametric surface is defined, STEP 30 "DEFINE 2-D ARRAY OF U,V VALUES". In particular, an array of U,V values representative of the parameterization intervals of the parametric surface is defined. The selection of the parameterization intervals is dependent on how fine the surface is defined. The manner in which the U,V parameters are selected for a particular parametric surface is known in the art. One example is described in commonly assigned, co-pending U.S. patent application, Ser. No. 07/933,602, entitled "Parametric Surface Evaluation Method and Apparatus For a Computer Graphics Display System," which is hereby incorporated by reference. A further example is discussed in a paper entitled "Generalized Scanning Techniques for Display of Parametric Surfaces," IEEE Computer Graphics and Applications, August 1987, which is also incorporated herein by reference. Depicted in FIG. 4a is one example of a parametric surface defined by an 11×11 (N×M) array of points 31. In one example, both the U and the V coordinates of a parametric surface start at zero and end at one, thereby providing a stepsize of 0.1. The points shown in the array of FIG. 4a represent a parametric surface, which includes 100 ((11−1)× (11−1)) quadrilaterals. A quadrilateral in the array is defined by four points. For example, points .0,.0; .1,.0; .0,.1 and .1,.1 of the array depicted in FIG. 4a define one quadrilateral. (It will be apparent to one of ordinary skill in the art that the array depicted in FIG. 4a is only one illustrative example. Further, the array need not include an equal number of rows and columns.)

Returning to FIG. 3, in addition to defining the two-dimensional array of U,V values, several indicators are defined, STEP 32 "DEFINE FLAGS." In one embodiment, an adjustment flag, a trimming indicator, and a vertical edge indicator for each point represented in the two-dimensional array are defined and initialized. As described in detail below, the adjustment indicators are used to indicate whether particular points of the parametric surface have been moved, and the trimming indicators reflect whether particular quadrilaterals of the parametric surface are to be rendered. In particular, if a quadrilateral is inside the trimming curve, then the quadrilateral is not drawn, and if it is outside the trimming curve, it is rendered. The vertical edge indicators are used to signify that a vertical section of the trimming curve (with respect to the array organization) passes through this point. Initially, the adjustment indicators are initialized to zero indicating no adjustment has been made and the trimming indicators are set to one, indicating all the quadrilaterals are to be rendered. The vertical edge indicators are set to zero, indicating no trimming boundaries have yet been defined. In one example, the adjustment, trimming, and vertical edge flags are defined as part of the two-dimensional array, as shown in FIG. 4b. As depicted in FIG. 4b, located at each index of array 31 is a U and a V value, an adjustment indicator (A), a trimming indicator (T), and a vertical edge indicator (E).

Subsequent to defining the array of U,V values and flags, as described above, one or more trimming curves are applied to the parametric surface, in accordance with the principles of the present invention, STEP 36 "APPLY TRIMMING CURVES". Trimming curves are approximated by trimming polylines (TPi) over U,V such that TPi=(Pi1(U,V) . . . Pin(U,V)), wherein Pi refers to a point on a particular trimming polyline. That is, in U,V space a number of points (ranging from one to n) exists for each trimming polyline of a trimming curve. In accordance with the principles of the present invention, the trimming polylines are applied to the parametric surface in U,V space. In particular, each point of the polyline is represented in two-dimensional array 31, as described below with reference to FIGS. 5a and 5b. It should be noted that the trimming polylines represent continuous closed figures with no gaps therein.

Figure 5A:
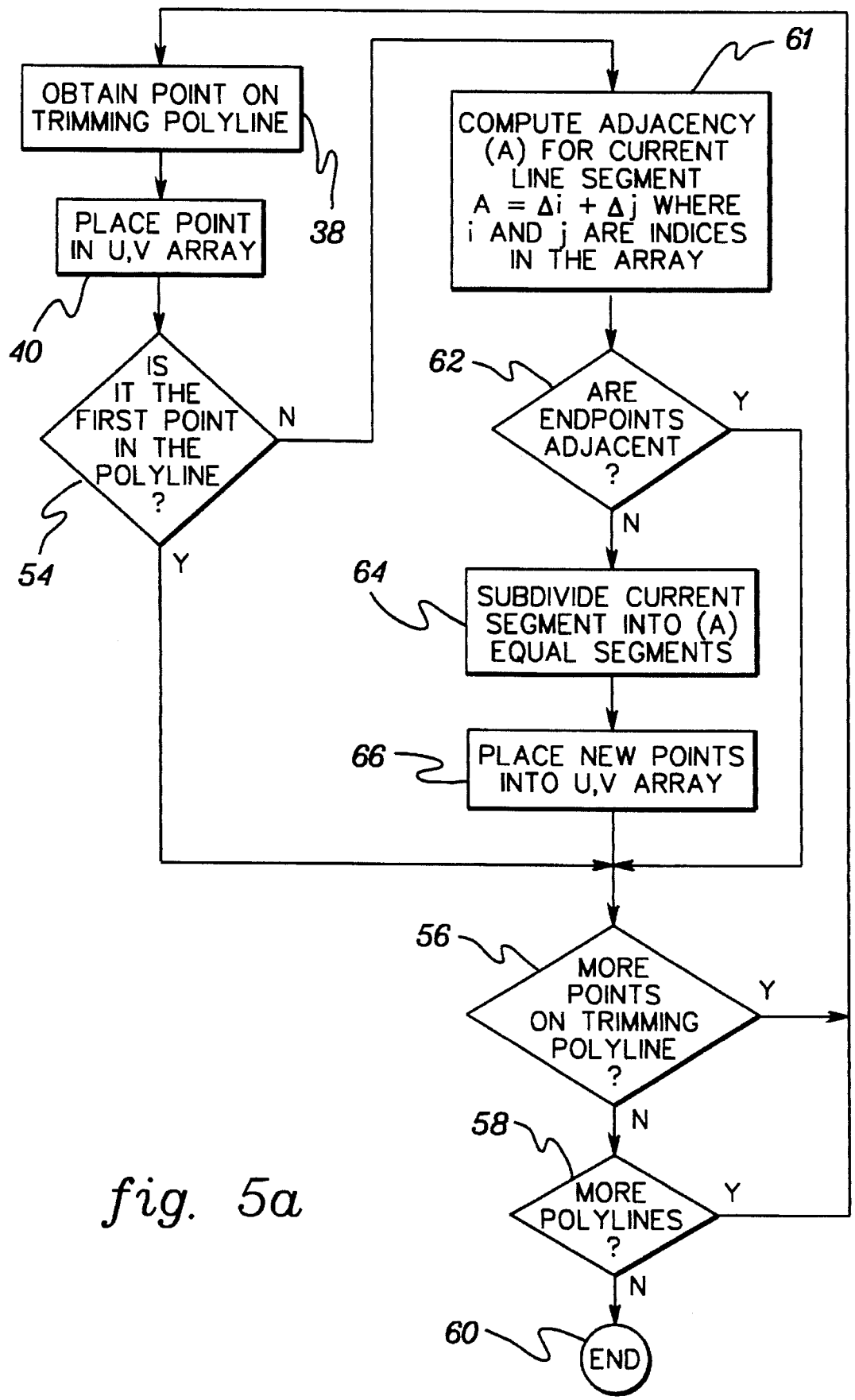
FIGS. 5a and 5b depict one example of a flow diagram of the technique for applying trimming polylines, in accordance with the principles of the present invention.
Figure 5B:
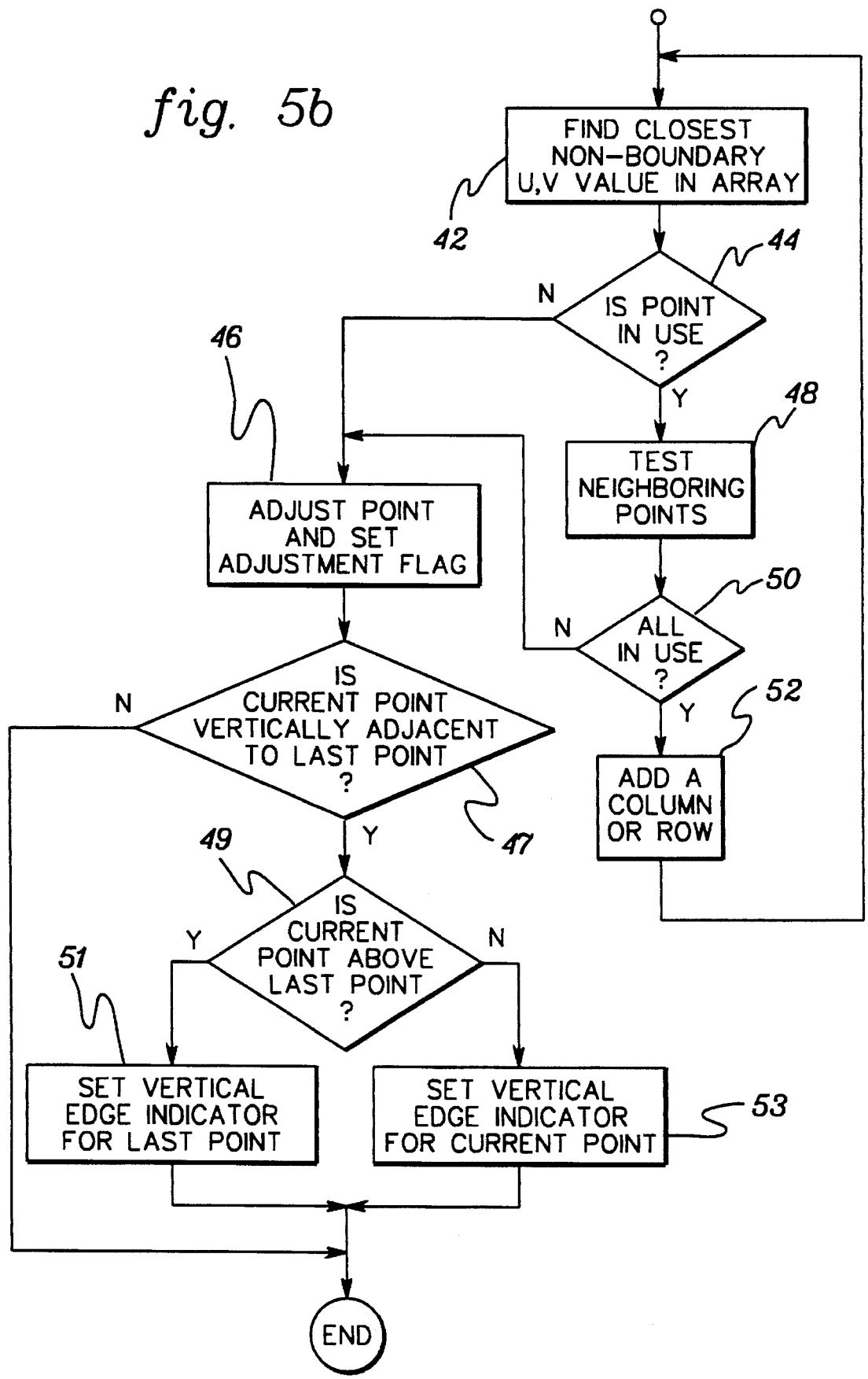

Referring to FIG. 5a, in order to apply a trimming polyline to a parametric surface, initially a point on the polyline is selected, STEP 38 "OBTAIN POINT ON TRIMMING POLYLINE", and then the point is placed in the array, as described in FIG. 5b, STEP 40 "PLACE POINT IN ARRAY".

Referring to FIG. 5b, in order to place the selected point in the array, initially, the array is scanned sequentially to find the closet U,V value to the selected point, STEP 42 "FIND CLOSEST NON-BOUNDARY U,V VALUE". If the closest value obtained is on a boundary of the array, then the next closest U,V value found during the sequential scan, which is not on a boundary of the array, is used. Subsequently, a determination is made as to whether the point having the closest U,V value to the point being placed in the array is already in use (i.e., it represents another point on the trimming polylines), INQUIRY 44 "IS POINT IN USE?" In order to make this determination, the adjustment flag described above is used. If the adjustment flag is set to one, then the point is already in use. Otherwise, the point may be adjusted, STEP 46 "ADJUST POINT AND SET ADJUSTMENT FLAG".

In order to adjust the point in the array, the selected U,V value in the array is replaced by the value of the point of the trimming polyline. For example, if the incoming point of the trimming polyline is .24,.24, and the closest U,V value in the array is .2,.2, then .2,.2 is replaced by .24,.24. Subsequently, the adjustment flag corresponding to the location in the array which received the values of .24,.24 is set to one, indicating the point is in use.

In addition to the above, a determination is made as to whether the current point placed in the array is vertically adjacent to the previous point placed in the array, INQUIRY 47 "IS CURRENT POINT VERTICALLY ADJACENT TO LAST POINT?" The points are adjacent if they have the same column index and are in adjoining rows. Should the points not be vertically adjacent, then placement of the point in the array is complete, and flow passes to INQUIRY 54 in FIG. 5a.

On the other hand, if the points are vertically adjacent, then a determination is made as to whether the current point is above the last point, INQUIRY 49 "IS CURRENT POINT ABOVE LAST POINT?" If the current point is above the last point, then the vertical edge indicator corresponding to the previous point (i.e., the point having the highest row address) is set to one, STEP 51 "SET VERTICAL EDGE INDICATOR FOR LAST POINT." Further, if the current point is not above the last point, the vertical edge indicator is set for the current point, STEP 53 "SET VERTICAL EDGE INDICATOR FOR CURRENT POINT." The vertical edge indicator is used to indicate that a vertical segment of the trimming curve (i.e., vertical with respect to the array organization) has a point at this location. The selection of the lower most point insures that the top point of a vertical section is not selected. At a later point in processing, the array is scanned from left to right in each row to determine whether a given quadrilateral is to be rendered. The vertical edge information is used to determine whether a new region (e.g., a hole) is being entered so the trimming indicator can be set accordingly.

Returning to INQUIRY 44, if the adjustment flag indicates that the point is already in use for another polyline point, then the other three neighboring points are checked until one is found that has not been used, STEP 48 "TEST NEIGHBORING POINTS". For the example described above, if the incoming point is .24,.24, then the following values are the closest values to .24,.24 and considered to be neighboring points to each other: (.2,.2); (.2,.3); (.3,.2); and (.3,.3). Therefore, if, as described above, .2,.2 is in use, then the neighboring points are selected and tested to see if they are in use. If one of the neighboring points is not in use, INQUIRY 50 "ALL IN USE?", then it is selected, its contents are changed to (.24,.24) and the adjustment flag is set, STEP 46, "ADJUST POINT AND SET ADJUSTMENT FLAG". Thereafter, flow passes to INQUIRY 47, as described above. However, if all of the adjustment flags are set indicating all of the four neighboring points are in use, then another row or column is added to the array, in order to provide additional points to be adjusted, STEP 52 "ADD A COLUMN OR A ROW."

A row or a column is added between two adjacent indices of the array (e.g., a column may be added between column 1 and column 2 of the array). The U,V values of the added column or row are initialized to a value halfway between its adjacent points. For example, if a column is added to an 11×11 array, then eleven values need to be initialized. If, for instance, the first value to be initialized is located between the points .2,.0 and .3,.0, then the first value of the added column is initialized to .25,.0. The remaining values of the added column are initialized in a similar manner. In addition, for each value in an added column or row, its corresponding adjustment flag is set to one, if the adjustment flags for the two adjacent points of the new point are also set to one. (This signifies that the new point lies on some previously processed trimming polyline segment.) Similarly, if a row was added and the point below has its vertical edge indicator set, the new point also has its vertical edge indicator set. Subsequent to adding the row or column, flow returns to STEP 42 "FIND CLOSEST NON-BOUNDARY U,V VALUE IN ARRAY."

Returning to FIG. 5a, after the selected point is placed in the array, an inquiry is made as to whether the point is the first point in the trimming polyline (each trimming polyline includes at least two points and each consecutive two points defines a line segment), INQUIRY 54 "IS IT THE FIRST POINT IN THE POLYLINE?" Should the point placed in the array be the first point of the trimming polyline, then flow passes to INQUIRY 56 "MORE POINTS ON TRIMMING POLYLINE?" If there are more points on the trimming polyline to be processed, then flow returns to STEP 38 "OBTAIN POINT ON TRIMMING POLYLINE". Otherwise, an inquiry is made as to whether there are further polylines to process, INQUIRY 58 "MORE POLYLINES?" Once again, if there are more polylines, flow returns to STEP 38. Otherwise, processing of the trimming polylines is complete, STEP 60 "END".

Returning to INQUIRY 54, if this is not the first point on the trimming polyline, an adjacency test is performed, STEP 61 "COMPUTE ADJACENCY (A) FOR CURRENT LINE SEGMENT A=Δi+Δj WHERE i and j ARE INDICES IN THE ARRAY". Since the object is to have each polyline segment lie on an edge of an included quadrilateral, the endpoints of the line segment should be adjacent in the array. The adjacency factor (A) is computed by adding the difference in the i (Δi) and j (Δj) array indices where the segment endpoints were placed. If A is equal to one, INQUIRY 62 "ARE ENDPOINTS ADJACENT?", the endpoints are adjacent and flow passes to INQUIRY 56 "MORE POINTS ON TRIMMING POLYLINE". On the other hand, if the endpoints are not adjacent (A is not equal to one), the polyline is divided into A equal segments by defining (A−1) new points on the segment, STEP 64 "SUBDIVIDE CURRENT SEGMENT INTO (A) EQUAL SEGMENTS". These new points are then placed in the array as described above, STEP 66 "PLACE NEW POINTS INTO U,V ARRAY." Subsequently, flow passes to INQUIRY 56 "MORE POINTS ON TRIMMING POLYLINE?"

Returning to FIG. 3, subsequent to applying the trimming polylines to the parametric surface, a quadrilateral mesh is generated, STEP 70 "CREATE A QUAD MESH." The quadrilateral mesh is coextensive with the parametric surface and represents the trimmed parametric surface in a geometric coordinate space (X,Y,Z space) (or X,Y,Z,W space where W refers to a weight).

In order to create a quadrilateral mesh, initially array 31 is scanned from left to right and top to bottom, ignoring the top row and left column, since those points by themselves do not define a quadrilateral. During scanning, the trimming indicators associated with each point of the array (i.e., the final array after all of the points are adjusted that need to be adjusted) are set, as described below. The trimming indicator is set to one if the quadrilateral to the upper left of the point associated with the indicator is to be drawn, and it is set to zero if the quadrilateral to the upper left is not to be drawn.

Figure 6:
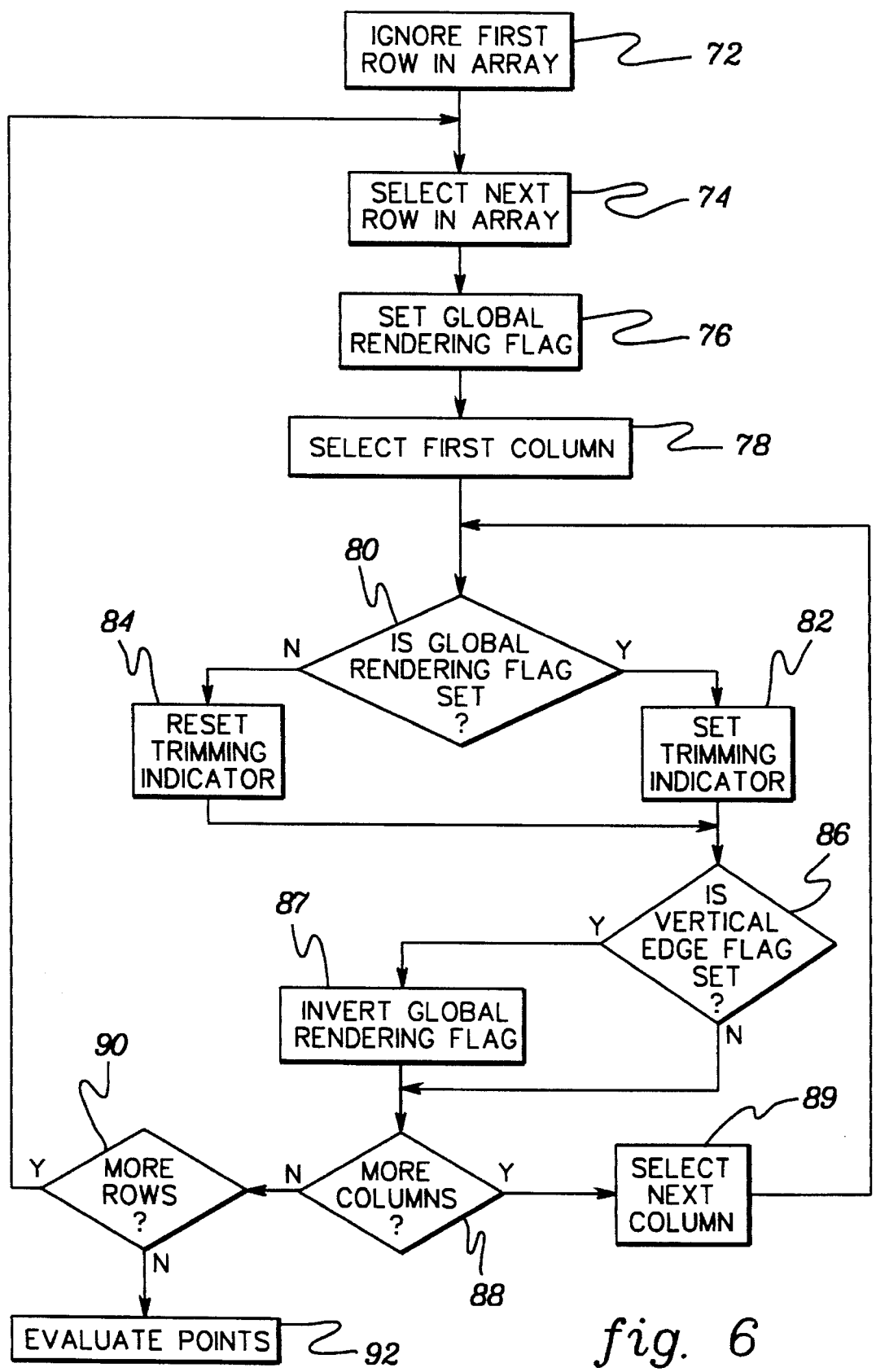
FIG. 6 depicts one example of a flow diagram of the technique for creating a quadrilateral mesh, in accordance with the principles of the present invention.

In particular, referring to FIG. 6, for each point in the first row of the array (i.e., the index of the array on the vertical axis is equal to zero), the trimming indicator is ignored, since the points in the first row cannot define a quadrilateral, STEP 72 "IGNORE FIRST ROW IN ARRAY." Therefore, the next row in the array is selected to be examined, as described further below, STEP 74 "SELECT NEXT ROW IN ARRAY."

In addition to the above, a global rendering flag, which is used to remember whether the state is render or not render, is initialized to one, STEP 76 "SET GLOBAL RENDERING FLAG." Subsequent to setting the global rendering flag a first column is selected, STEP 78 "SELECT FIRST COLUMN."

After selecting the first column, a determination is made as to whether the global rendering flag is set, INQUIRY 80 "IS GLOBAL RENDERING FLAG SET?" Should the flag be set, the trimming indicator is also set indicating that the quadrilateral to the upper left is to be rendered, STEP 82 "SET TRIMMING INDICATOR." As described below, the trimming indicator for the first column is ignored during rendering, since a quadrilateral has not been defined as of yet. Returning to INQUIRY 80, if the global rendering flag is not set, the trimming indicator is reset, indicating that the next quadrilateral to the upper left is not to be rendered, STEP 84 "RESET TRIMMING INDICATOR." The trimming indicator is reset by inverting the value of the flag.

Subsequently, a determination is made as to whether the vertical edge flag for the current point is set, INQUIRY 86 "IS VERTICAL EDGE FLAG SET?" If the vertical edge flag is set, then the global rendering flag is inverted, STEP 87 "INVERT GLOBAL RENDERING FLAG" and flow passes to INQUIRY 88, described below. If the vertical edge flag is not set, the global rendering flag is not inverted and flow passes to INQUIRY 88 "MORE COLUMNS?" If there are more columns to be processed, a next column is selected, STEP 89 "SELECT NEXT COLUMN" and flow passes to INQUIRY 80. On the other hand, if there are no more columns to process, an inquiry is made as to whether there are more rows to process, INQUIRY 90 "MORE ROWS?" If there are more rows in the array to process, flow returns to STEP 74 "SELECT NEXT ROW IN ARRAY." Otherwise, if there are no more rows to process, each of the points are evaluated, as described below, in order to provide geometric coordinates (e.g., X,Y,Z coordinates) for each point, as described below, STEP 92 "EVALUATE POINTS."

The foregoing discussion describes the situation where the boundary of the U,V surface is always rendered since the trimming curves are not applied on the boundaries. An example of such use would be a surface containing holes. If it is desirable to trim the edges of such a surface, the edges (and any included holes) are processed as described above, but the array is initialized with the vertical edge indicator of the leftmost column set. This has the effect of inverting the sense of the rendered/not rendered areas during the row processing.

Geometry processing engine 18 evaluates each of the points using a predetermined surface defining function and a predetermined normal function in order to obtain an X,Y,Z coordinate. In general, the following represents a surface defining function:

$$P(X,Y,Z)=Fp(U,V) \; 0 \leq U,V \leq 1$$

That is, for each point in the array, X,Y,Z are evaluated as a function of U and V. In particular, as one example, if it is desired to have a surface defining function that corresponds to a half cylinder located at origin, the following function is used:

$$P(X,Y,Z)=Fp(U,V)=(\cos{(pi{\times}U)},\ V,\ \sin{(pi{\times}U)})$$

where pi is a point in the array.

Likewise, in general, the following represents a normal function:

$$N(X,Y,Z)=Fn(U,V)\ 0 \leq U,V \leq 1$$

and for the same cylinder described above, the function is as follows:

$$N(X,Y,Z)=Fn(U,V)=((\cos{(pi{\times}U)},\ 0,\ \sin{(pi{\times}U)}).$$

Each evaluated point is placed in a two-dimensional geometric coordinate array which holds X,Y,Z for each point, N for each point and a copy of the trimming flag for each point.

After each point is evaluated, using any predetermined surface and normal function as desired, the geometric coordinate array is passed to raster processing engine 20, which in accordance with the principles of the present invention has been modified such that it can receive and process the trimming flags. (It is advantageous for enhanced performance that the raster processing engine be able to receive the entire array. If the processing engine is not capable of receiving the entire array, then individual quadrilaterals can be sent down.) However, during rendering, the array of geometric coordinate values and trimming flags is scanned from left to right and top to bottom. During rendering, the trimming flags in the first row and first columns are ignored since quadrilaterals are defined after four points have been scanned. If the trimming indicator in each of the rows and columns thereafter, is equal to one, then the quadrilateral to the upper left is rendered. On the other hand, if the trimming flag is equal to zero, then the quadrilateral to the upper left is not rendered. When rendering the quadrilaterals, it is possible that some of the points of the quadrilateral are equal and thus, in effect a triangle, line or point is rendered.

Figure 7:
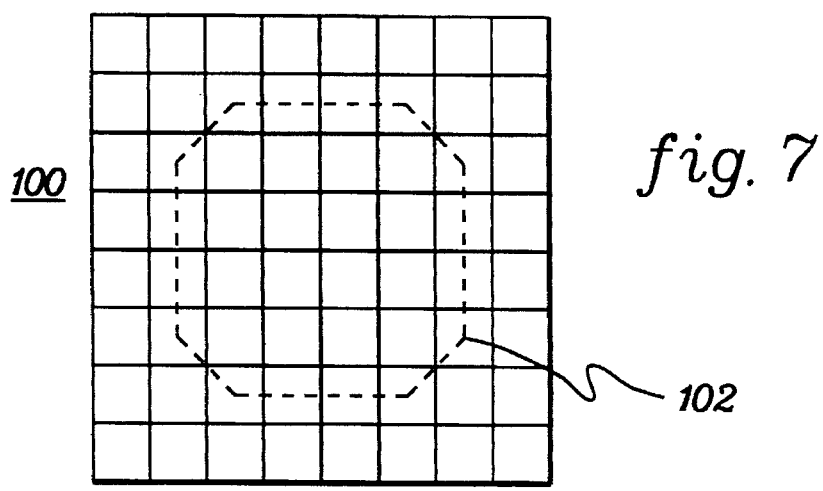
FIG. 7 depicts one example of a parametric surface with a trimming curve applied thereto.
Figure 8:
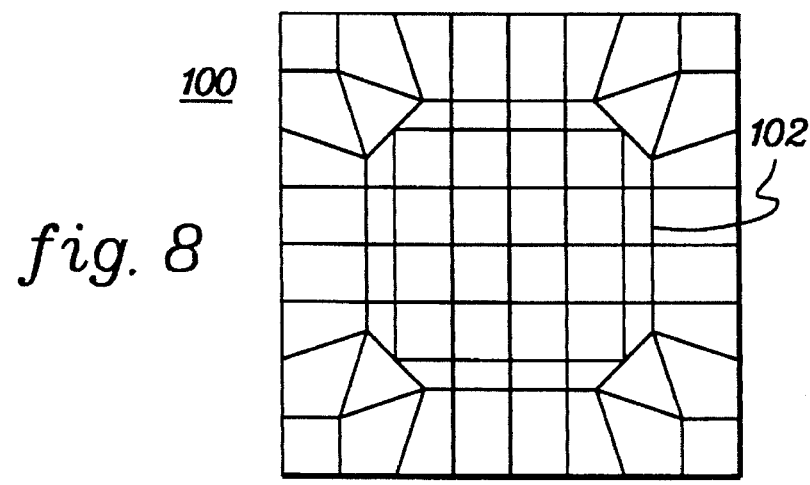
FIG. 8 is an illustration of how the points of an array are moved to coincide with the trimming curve, in accordance with the principles of the present invention.
Figure 9:
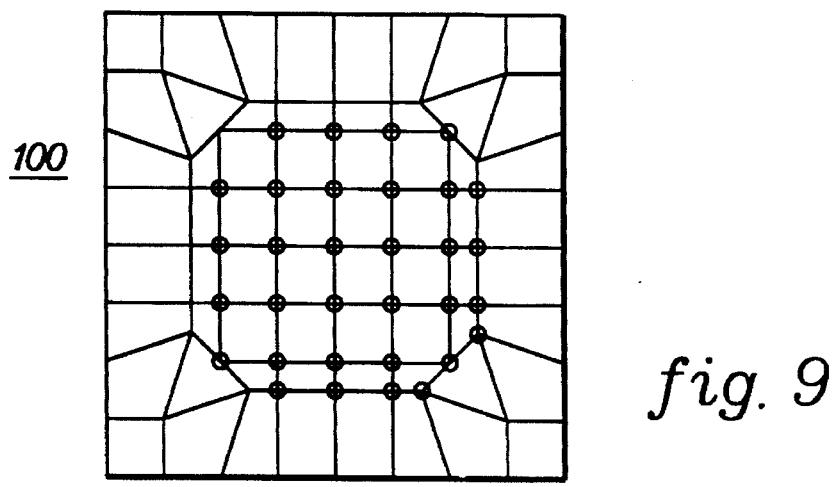
FIG. 9 depicts one example of the parametric surface of FIG. 7, with the trimming indicator set at the appropriate points, in accordance with the principles of the present invention.
Figure 10:
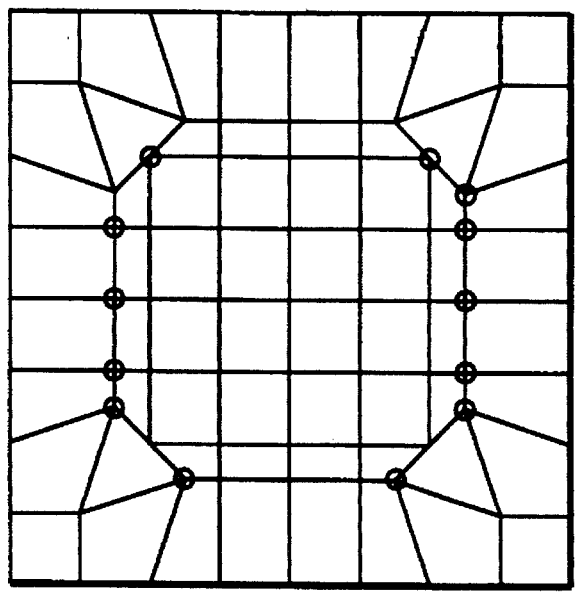
FIG. 10 depicts one example of the parametric surface of FIG. 7, with the vertical edge flags set at the appropriate points, in accordance with the principles of the present invention.
Figure 11:
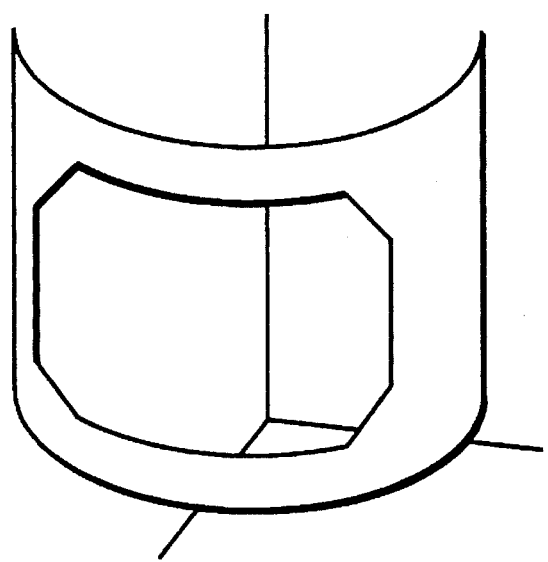
FIG. 11 depicts a resulting image after each of the points of the parametric surface depicted in FIG. 7 are evaluated, in accordance with the principles of the present invention.

Described above is a technique for representing a parametric surface as a quadrilateral mesh. Using FIGS. 7–11, one example is shown at various steps during processing. It will be understood to one of ordinary skill in the art that the below described example is only one illustrative example. Depicted in FIG. 7 is one example of a parametric surface 100, represented by an array of 9×9 points, with a trimming curve 102 superimposed thereon. Using the technique of the present invention, points of the array are adjusted such that the points and line segments of the trimming curve coincide with points and edges of the array of U,V values, as depicted in FIG. 8. (FIG. 8 depicts the same surface as shown in FIG. 7, with the trimming curve applied, in accordance with the principles of the present invention.) As described previously, during processing, the trimming indicator is reset when the global rendering flag is not set (FIG. 6) and the vertical edge indicator is set, as described in FIG. 5b. One example of the results of these steps are shown in FIGS. 9 and 10, respectively. Shown in FIG. 9 is the same trimmed parametric surface depicted in FIGS. 7 and 8 with a circle drawn at the points where the trimming indicator is reset (i.e., set to zero). Notice that the quadrilaterals to the upper left of these points are not drawn. In addition, illustrated in FIG. 10, is the same surface as in FIG. 9, however, the trimming indicator is not set as of yet, and instead the vertical edge indicator is set.

The vertical edge indicator is set only at the points that define a vertically rising line segment of the trimming curve. In addition to the above, in FIG. 11, the same surface is illustrated in geometric coordinate space after the surface defining and normal functions have been applied.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer implemented method for generating for display a trimmed parametric surface as a single quadrilateral mesh in a computer graphics system, said parametric surface comprising a plurality of parametric coordinates and having one or more trimming polylines applied thereto, said method comprising the computer implemented steps of:

defining a plurality of line segments representative of said one or more trimming polylines; and generating the single quadrilateral mesh coextensive with said parametric surface, said single quadrilateral mesh having a plurality of edges coinciding with said plurality of line segments of said trimming polylines, said generating comprising the steps of:

defining in a memory means an array of U,V values, said array representing points of said parametric surface before said one or more trimming polylines are applied;

identifying a plurality of points representative of said trimming polylines;

determining whether each of said points is located within said array of U,V values; and placing in said array each of said points determined not to be in said array, each of said points determined not to be in said array replacing a U,V value neighboring to it and located in said array;

determining whether said neighboring value can be replaced; and adding one of a row or a column to said array when said neighboring value cannot be replaced;

rendering for display said trimmed parametric surface by traversing said array.

2. The method of claim 1, wherein said points located in said array, subsequent to performing said placing step, define a number of quadrilaterals and said method further comprising the step of determining whether each of said number of quadrilaterals is to be rendered.

3. The method of claim 2, further comprising the step of evaluating each U,V value associated with said quadrilateral to be rendered.

4. The method of claim 3, wherein said evaluating step comprises the steps of:

using a predetermined surface defining function to determine a plurality of geometric coordinates for each of said U, V values; and using a predetermined normal defining function to determine a surface normal for each of said U, V values, said surface normal facilitating rendering of said quadrilaterals to be rendered.

5. The method of claim 2, further comprising the step of setting a trimming indicator to a first value when said quadrilateral is to be rendered.

6. The method of claim 1, wherein said neighboring determining step comprises the step of checking an adjustment indicator, said adjustment indicator having a first value when said neighboring value cannot be replaced.

7. A computer implemented method for generating a displayable trimmed parametric surface in a computer graphics system, said method comprising the computer implemented steps of:

defining in a memory means an array of U,V values, said array representing points of a parametric surface;

identifying one or more trimming polylines to be applied to said parametric surface, each of said one or more trimming polylines having a plurality of points;

determining whether each of said points is located within said array;

placing in said array each of said points determined not to be in said array such that a final array of values is provided, each of said points determined not to be in said array replacing a U, V value neighboring to it and located in said array;

determining whether said neighboring value can be replaced;

adding one of a row or a column to said array when said neighboring value cannot be replaced;

generating a quadrilateral mesh representative of said parametric surface defined by said final array; and rendering for display said trimmed surface from said quadrilateral mesh.

8. The method of claim 7, wherein said generating step comprises the steps of:

using a predetermined surface defining function to determine a plurality of geometric coordinates for each of said U, V values in said final array; and using a predetermined normal defining function to determine a surface normal for each of said U, V values in said final array, said surface normal facilitating rendering of said quadrilaterals to be rendered.

9. The method of claim 7, further comprising the step of setting for each of said points of said trimming polylines a corresponding adjustment indicator.

10. The method of claim 7, wherein said points of said final array define a number of quadrilaterals, and said method further comprises the steps of:

determining whether each of said number of quadrilaterals is to be rendered; and setting to a first value a trimming indicator corresponding to each of said number of quadrilaterals to be rendered.

11. A system for generating for display a parametric surface as a single quadrilateral mesh, said parametric surface comprising a plurality of parametric coordinates and having one or more trimming polylines applied thereto, said system comprising:

memory means for storing said plurality of parametric coordinates;

means for modifying said memory means to store a plurality of line segments representative of said one or more trimming polylines, said polyline segments preserving a single quadrilateral mesh for said parametric surface; said means for modifying comprising:

means for defining in said memory means an array of U, V values, said array representing said plurality of parametric coordinates of said parametric surface before said one or more trimming polylines are applied;

means for identifying a plurality of points representative of said trimming polylines;

means for determining whether each of said points is located within said array;

means for placing in said array each of said points determined not to be in said array, each of said points determined not to be in said array replacing a U, V value neighboring to it and located in said array;

means for determining whether said neighboring value can be replaced; and means for adding one of a row or a column to said array when said neighboring value cannot be replaced; and means for generating for rendering the signal quadrilateral mesh coextensive with said parametric surface, said single quadrilateral mesh having a plurality of edges coinciding with said plurality of line segments of said trimming polylines.

12. The system of claim 11, further comprising means for determining whether each of a number of quadrilaterals defined by said points located in said array is to be rendered.

13. The system of claim 12, further comprising means for evaluating each U,V value associated with said quadrilateral to be rendered.

14. The system of claim 13, wherein said evaluating means comprises:

means for using a predetermined surface defining function to determine a plurality of geometric coordinates for each of said U, V values; and means for using a predetermined normal defining function to determine a surface normal for each of said U, V values, said surface normal facilitating rendering of said quadrilaterals to be rendered.

15. The system of claim 11, wherein said neighboring determining means comprises means for checking an adjustment indicator, said adjustment indicator having a first value when said neighboring value cannot be replaced.

16. The system of claim 12, further comprising means for setting a trimming indicator to a first value when said quadrilateral is to be rendered.

17. A computer graphics system for rendering a trimmed parametric surface, said system comprising:

memory means for storing an array of U, V values, said array representing points of a parametric surface;

means for identifying one or more trimming polylines to be applied to said parametric surface, each of said one or more trimming polylines having a plurality of points;

means for determining whether each of said points is located within said array;

means for placing in said array each of said points determined not to be in said array such that a final array of values is provided, each of said points determined not to be in said array replacing a U, V value neighboring to it and located in said array;

means for determining whether said neighboring value can be replaced;

means for adding one of a row or a column to said array when said neighboring value cannot be replaced;

means for generating a quadrilateral mesh representative of said parametric surface defined by said final array; and means for rendering said trimmed parametric surface from said quadrilateral mesh.

18. The system of claim 17, wherein said generating means comprises:

means for using a predetermined surface defining function to determine a plurality of geometric coordinates for each of said U, V values in said final array; and means for using a predetermined normal defining function to determine a surface normal for each of said U, V values in said final array, said surface normal facilitating rendering of said quadrilaterals to be rendered.

19. The system of claim 17, further comprising means for setting for each of said points of said trimming polylines a corresponding adjustment indicator.

20. The system of claim 17, further comprising means for setting to a first value a trimming indicator corresponding to each of a number of quadrilaterals defined by said points to be rendered.

* * * * *